United States Patent Office 3,013,709
Patented Dec. 19, 1961

3,013,709
NON-FLAKING WAX COMPOSITION CONTAIN-
ING LIQUID POLYPROPYLENE
Joseph C. Mason, Jr., Claymont, Del., assignor to Sun
Oil Company, Philadelphia, Pa., a corporation of New
Jersey
No Drawing. Filed Oct. 26, 1960, Ser. No. 65,015
10 Claims. (Cl. 229—3.1)

This invention relates to a novel wax composition. It particularly relates to a wax composition containing a major proportion of a specific paraffin wax and minor proportions of specific microcrystalline wax, another specific paraffin wax, a specific polyolefin wax, and liquid polypropylene, the composition being especially suitable for coating fibrous sheets and containers for packaging liquids. More particularly, it relates to a wax composition having superior non-flaking characteristics, being especially suitable for coating fibrous milk containers.

The use of wax to coat fibrous containers for use in packaging liquids is well known in the art. A particularly useful paraffin wax suitable for coating such containers is described and claimed in U.S. Patent No. 2,624,501. However, actual commercial use has disclosed several disadvantages of coatings formed from this wax. Such coatings on fibrous sheet material may develop minute imperfections which impart a serpentine effect to the coating, thereby creating an unsightly appearance, and leakage of packaged liquid materials through the imperfections may develop. A further difficulty of this wax, as has been found, is the tendency of the coatings formed therefrom to fracture and break away from the fibrous material on suffering an impact so that wax "flakes" are present in the packaged liquid. Such flaking action of a wax is highly undesirable because the products is rendered objectionable to ultimate customers.

An object of the present invention is to provide a wax composition especially suitable for coating fibrous containers for fluids. A particular object is to provide a wax composition effective for coating paper containers for liquids which imparts a pleasing appearance to the resulting article of manufacture while providing good coverage and good blocking characteristics and which can be readily applied with conventional equipment. A specific object is to provide a wax composition which, when formed as a coating for a fibrous container, will not easily fracture on impact and will have substantially non-flaking characteristics.

The above and other objects can be obtained by blending the following components having specific properties in specific proportions: a relatively low melting paraffin wax, a relatively high melting paraffin wax, a microcrystalline wax having laminating properties, low molecular weight polyolefin wax, and liquid polypropylene.

As used herein, melting points are determined by ASTM D87–57, penetrations by ASTM D1321–57T, and viscosities (SUS-Saybolt Universal Seconds) by ASTM D446–53, unless otherwise stated. All percentages are weight percent.

The components of the wax composition of the present invention are characterized as follows:

WAX A

This is a relatively low melt point paraffin wax. It must have a melting point of from 125° F. to 132° F., a penetration (at 77° F.) of from 17 to 23, a viscosity (at 210° F.) of from 37 to 41 seconds, and a tensile strength at 40° F. of from 275 p.s.i. to 325 p.s.i., the tensile strength at 40° F. being at least 25 p.s.i. higher than the tensile strength at 70° F. This relatively low melt point paraffin wax may be prepared as follows: A slack wax from the dewaxing of lubricating oil, which may contain about 30% oil, is vacuum distilled and the fraction distilling between about 390° F. and 565° F. at 2 mm. of mercury pressure is collected. This fraction is dissolved in a solvent, preferably a mixture of methyl ethyl ketone and benzene in about equal volumes. Dissolution is performed at an elevated temperature, from about 165° F. to 195° F. being suitable, and advantageously about 6 parts by volume of solvent per part of wax is used. The solution is slowly cooled to a temperature of from 75° F. to 83° F. and the wax which precipitates at this temperature is separated such as by filtration. The solution separated from the precipitated wax is further slowly cooled to a temperature of from 28° F. to 33° F. and the wax which precipitates at this temperature is separated and forms Wax A of the present composition. Preferably, the wax after separation from solution is washed, such as with the solvent employed for dissolution, preferably at the same temperature as used for filtration, namely from 28° F. to 32° F. and the wax is then separated.

An alternate method of preparing Wax A of the present invention which provides considerable flexibility in obtaining the desired wax product is to separate from slack wax two distillate fractions, one distilling under vacuum in the range of from about 390° F. to 475° F. at 2 mm. of mercury pressure and a second fraction distilling in the range of from about 450° F. to 565° F. at 2 mm. of mercury pressure. As usually occurs, the initial boiling point of the second fraction will overlap the end point of the first-mentioned distilled fraction. The lower boiling distillate fraction is dissolved in a solvent as above described and the solution is cooled to a temperature of from 25° F. to 31° F. The wax which precipitates at this temperature is separated as by filtering. The higher boiling distillate fraction is dissolved in a solvent as above described, except that a lower proportion of solvent to wax, say about 4.5 parts per of solvent per part of wax, is advantageously used, and the solution is slowly cooled to a temperature of from 72° F. to 82° F. The wax which precipitates at this temperature is separated such as by filtering and the remaining solution is further slowly cooled to a temperature of from 25° F. to 31° F. The wax which precipitates at this latter temperature is separated as by filtering. The two distillate waxes so-prepared are combined to form Wax A of the present invention. Considerable flexibility is obtained since the blending may be in various proportions so that the properties of the resulting wax mixture can be varied within the limits above-described for Wax A. If desired, the two waxes can be washed and dried prior to blending, or the wet waxes may be combined and simultaneously washed and then recovered by removal of the wash liquid. In general, from about 60 to 75 percent by weight of the paraffin wax will comprise wax from the lower boiling distillate fraction since, as has been found, such mixture gives a wax having properties within those defined for Wax A of the invention. It is preferred, however, that Wax A comprise 75% lower boiling distillate fraction and 25% higher boiling distillate fraction.

WAX B

This is a relatively high melt point paraffin wax. It must have a melting point of from 148° F. to 154° F., a penetration (at 100° F.) of from 13 to 19, and a viscosity (at 210° F.) of from 40 to 46 seconds. This relatively high melt point paraffin wax may be prepared as follows: A slack wax from the dewaxing of lubricating oil or from topping a high wax content crude oil, is distilled under vacuum, and the fraction distilling in the range of from about 450° F. to 565° F. at 2 mm. of mercury pressure is collected. The distillate fraction is dissolved in a solvent which is preferably a mixture of methyl ethyl ketone and benzene in about equal parts by volume, dissolution advantageously being at a temperature of from about 165° F. to 190° F. as above described, using about 2 parts of solvent per part of wax. The solution is slowly cooled to a temperature of from about 77° F. to 83° F. and the wax precipitated at this temperature is separated. The separated wax is washed such as with the solvent employed for dissolution, preferably at the same temperature as used for filtration, and the wax is recovered. This waxs forms Wax B of the present invention.

WAX C

This is a microcrystalline wax having laminating properties. It must have a penetration (at 110° F.) of from 69 to 75, a viscosity (at 210° F.) of from 70 to 79, and an adhesion value of from 30 to 120, preferably between 65 and 85. The Wax C may be obtained by any of the methods known to the art. One especially suitable method is described and claimed in U.S. Patent No. 2,783,183. In general, the method of obtaining microcrystalline wax with "laminating" quality is as follows: A slack wax having from about 20 percent to about 50 percent oil is subjected to vacuum distillation to form a plurality of fractions. The desired fraction is dissolved in a hot solvent, such as a mixture of methyl ethyl ketone and benzene, chilled at one desired temperature and the precipitated wax separated by, say, filtration. The filtrate from this first step is further chilled to another desired lower temperature, and the precipitated wax separated and recovered. This sequence is repeated until the desired wax fraction is obtained.

For example, a microcrystalline wax suitable for use in the composition of this invention is prepared as follows: Slack wax containing about 30 percent oil, obtained from the dewaxing of lubricating oils, is continuously vacuum distilled at 650° F. into two distillate fractions, one being removed at about 420° F. at 6 mm. mercury pressure, and the other at about 590° F. at 25 mm. mercury pressure. These low boiling fractions constitute 68 percent of the total charge. The high boiling residual fraction constitutes 32 percent of the total charge and is used for the recovery of the desired microcrystalline wax. This high boiling residual fraction is dissolved in 3.5 parts of a hot (150° F.) solvent mixture comprising 53 percent methyl ethyl ketone and 47 percent benzene. The resulting wax solution is cooled to 93° F., diluted with 5.5 parts of solvent, filtered (or centrifuged) to remove the precipitated wax, and the wax is washed with 4 parts of solvent. The filtrate from the initial filtrations is further cooled to 58° F., diluted with 6 parts of solvent, filtered, and washed with 4 parts of solvent. The wax product finally obtained, after solvent removal, has an adhesion value between 30 and 120 grams pull per 2 inch width and is designated herein as Wax C.

POLYOLEFIN WAX

As used herein, the term "polyolefin wax" is intended to include the following: low molecular weight polyethylene and low molecular weight isotactic (crystalline) polypropylene.

The polyethylene wax, designated herein as PE, must have an average number molecular weight between 1,000 and 12,000. Further, a suitable PE has a melt point between about 205° F. and 230° F. and a specific gravity between about 0.900 and 0.930. For example, the PE used herein to illustrate the invention had these properties: average molecular weight, 2,000; melt point, 219° F. to 226° F. (ASTM E28–51T); hardness, 3 to 5 (ASTM D1321–55T); specific gravity about 0.92; and viscosity at 140° C. of about 180 centipoises.

The polypropylene wax, designated herein as PP, must have an average number molecular weight between 1,000 and 12,000 and is characterized by a high degree of crystallinity. A particularly suitable PP is described and claimed in U.S. Patent No. 2,835,659. However, any commercially available PP which is highly crystalline and within the above specified molecular weight range can be used satisfactorily in this invention. Typically, satisfactory PP has a melt point between about 280° F. and 335° F., a specific gravity between about 0.900 and 0.920, and an average molecular weight between about 7,000 and 9,000.

It is recognized that PP and PE may be copolymerized to a suitable polyolefin wax and used in the wax composition of the invention or may be used concurrently as components of said wax composition, or, preferably, may be used separately and individually as a component in said wax composition.

LIQUID POLYPROPYLENE

The liquid polypropylene can be prepared as described and claimed in the copending application of Stuart et al., Serial No. 692,554, now Patent No. 2,967,206. Briefly, the liquid polymer can be made by contacting propylene at a temperature of from 32° F. to 338° F. and a pressure of from atmospheric to 10,000 p.s.i.g. with a catalyst consisting of particles of titanium trichloride dispersed in a liquid reaction medium and monoethyl aluminum dichloride. The resulting liquid polymer has a molecular weight from about 200 to about 5,000.

For example, a reaction medium consisting of a mixture of saturated hydrocarbons, mostly octanes, was introduced into a reactor containing a stirrer. To this was added a solution of 1.093 parts of monoethyl aluminum dichloride in 450 parts of the same saturated hydrocarbon reaction medium. The mixture was heated to 71° C., and at this temperature 943 parts of propylene were introduced into the reaction medium. The stirrer was then started, and 2.19 parts of titanium trichloride particles dispersed in 280 parts of the reaction medium were added. Polymerization began immediately, as evidenced by a drop in the pressure in the reactor. Additional propylene was added to maintain the pressure at about 258 p.s.i.g. After 2.17 hours, 107 parts of propylene had been added. Methanol was added to stop the reaction, and the unreacted propylene was vented. The deactivated catalyst was separated, and the reaction medium evaporated, leaving 154 parts of liquid polypropylene having an average molecular weight of 290. This product is used herein for illustrative purposes and is designated as LPP.

It is also within the scope, and it is intended, to include the process of making liquid polypropylene by thermal degradation of solid, high molecular weight polypropylene to liquid polymers suitable for use in this invention.

The above-specified components in specific combination make up the wax composition of the present invention. the incorporation of these components into the wax composition can be by any convenient means, such as by blending the waxes in molten state, together with the liquid and solid polymers, to obtain a homogeneous blend.

The solvent designated in the methods of preparing the wax components may be of any of the known dewaxing and deoiling solvents. The preferred solvent is a mixture of methyl ethyl ketone and benzene. Either of the components of the solvent may be replaced, however, in whole or in part, by other ketones, such as methyl butyl ketone or acetone, or hydrocarbons or halogenated hydrocarbons such as ethylene dichloride, pentane, and hexane, or alcohols such as propyl or the heptyl alcohols.

The adhesion test used herein for the microcrystalline wax component is performed as follows: Two strips of glassine paper, 2 inches by 6 inches, are laminated with the wax under test by pressing them mildly on a hot plate at a temperature just above the melting point of the wax. The load is adjusted to about 8 pounds of wax per ream of laminate, evenly distributed between the strips. This laminate is held at 73° F. in an atmosphere of 50 percent relative humidity for one hour before testing. Adhesion is the grams pull per 2 inch width required to separate the strips by peeling.

Laminating waxes of the microcrystalline type will have adhesion values, measured as described above, of from 30 to 120. Typical samples of microcrystalline waxes were tested and the following adhesion values were obtained: 35, 49, 59, 62, 74, 84, 89, 99 and 117.

The Tinius-Olsen angle of fracture test used herein to evaluate the flaking properties of waxes is performed on the Tinius-Olsen stiffness tester which has a six pound capacity. The procedure is as follows: Wax is formed into strips of specified dimensions (0.16 inch thick by 0.5 inch wide by 2 inches long) by solidifying molten wax on the surface of water to form the desired thickness, and cutting to the other dimensions. These wax strips are placed in the Tinius-Olsen stiffness tester and are evaluated for angle of fracture at 73° F. and at 36° F. This angle of fracture as measured by this apparatus is the angle to which the specimen may be bent without complete fracture. Thus, it is desirable to formulate a wax composition which will, under test, fracture at a high angle of deformation. An angle of 90° is the maximum deformation that can be measured on this instrument. However, for practical reasons, the maximum angle usually measured is 78°. Therefore, the number 78° should be interpreted as 78°+.

The angle of fracture values at 73° F. and 36° F. are necessary for complete definition of flaking properties of the specimen. However, the angle of fracture at 36° F. is the critical value because this temperature corresponds to the refrigeration temperature to which, say, milk cartons are exposed. The flaking characteristics are evaluated by determining the grams of wax which flake off per 1,000 milk cartons of one quart size, after subjecting the milk cartons to the standard drop test. Accordingly, the amount of flaking to be expected from a wax composition has been correlated with the angle of fracture at 36° F.

| Flaking, grams: | 36° F. angle of fracture |
|---|---|
| 0 | 19+ |
| 3 | 17 |
| 6 | 15 |
| 14 | 11 |
| 20 | 9 |
| 50 | 7 |

Actual experience has shown that a wax composition with substantially non-flaking characteristics must have a minimum angle of fracture at 36° F. of 15° and at 73° F. a minimum of 20°. The wax composition of the present invention must have Tinius-Olsen angles of fracture within these specified values. On the other hand, the commercially available waxes of the art, such as the wax described in U.S. Patent No. 2,624,501, will have an angle of fracture at 36° F. of about 7° which represents about 50 grams of wax flaking per 1,000 milk cartons of one quart size.

Therefore, according to the present invention, wax compositions having substantially non-flaking characteristics must have a Tinius-Olsen angle of fracture at 36° F. of at least 15° and at 73° F. of at least 20°.

"Non-flaking" as used herein is defined, in general, as applicable to wax compositions which result in wax flaking from 0 to 6 grams of wax per 1,000 milk cartons of one quart size. More particularly, "non-flaking" is applicable to wax compositions having a Tinius-Olsen angle of fracture at 36° F. of from 15° to 50° and at 73° F. of from 20° to 78°+.

It is essential for purposes of the present invention that the components be combined in amounts within the following specified ranges:

| Component: | Concentration range, percent |
|---|---|
| Wax A | 55 to 69 |
| Wax B | 20 to 25 |
| Wax C | 10 to 15 |
| Polyolefin wax | 0.5 to 2 |
| Liquid polypropylene | 0.5 to 3 |

An excellent example of the wax composition of the invention is a blend of:

| | Percent |
|---|---|
| Wax A | 63 |
| Wax B | 20 |
| Wax C | 15 |
| Polyethylene | 1 |
| Liquid polypropylene | 1 |
| | 100 |

The above wax composition had an angle of fracture at 36° F. of 16° and at 73° F. of 24°, which according to the correlation is equivalent to about 3 grams of wax flaking per 1,000 milk cartons.

To further show the criticality of component concentration, the following illustrations are presented:

*Example I*

A commercially available paraffin wax having properties according to Wax A was tested for flaking characteristics with the following results:

| Wax A, percent | Angle of fracture | |
|---|---|---|
| | 73°F. | 36°F. |
| 100 | 7 | 5 |

Thus, this relatively low melt paraffin wax is extremely poor in flaking characteristics.

*Example II*

A commercially available polyethylene wax having typical properties as disclosed hereinabove was blended into molten Wax A. Upon solidifying and testing, the following results were obtained:

| Wax A | PE | Angle of fracture | |
|---|---|---|---|
| | | 73°F. | 36°F. |
| 99 | 1 | 8 | 5 |
| 98 | 2 | 16 | 7 |
| 97.5 | 2.5 | 11 | 6 |

It is concluded that a polyolefin wax blended with only Wax A does not produce a substantially non-flaking wax.

*Example III*

Liquid polypropylene prepared as hereinabove described was blended into Wax A with the following result:

| Wax A | LPP | Angle of fracture | |
|---|---|---|---|
| | | 73°F. | 36°F. |
| 99 | 1 | 4 | 5 |

Thus, LPP blended into only Wax A fails to produce a substantially non-flaking wax.

*Example IV*

The following blend illustrates the fact that mixing PE and LPP in only Wax A does not produce a substantially non-flaking wax.

| Wax A | PE | LPP | Angle of fracture | |
|---|---|---|---|---|
| | | | 73° F. | 36° F. |
| 98 | 1 | 1 | 9 | 7 |

Example V

The addition of a laminating microcrystalline wax, Wax C, does not significantly improve the flaking characteristics of a paraffin wax containing polyethylene. This result is illustrated as follows:

| Wax A | PE | Wax C | Angle of fracture ||
|---|---|---|---|---|
| | | | 73° F. | 36° F. |
| 88 | 2 | 10 | 13 | 8 |
| 83 | 2 | 15 | 13 | 8 |

Example VI

The further addition of a relatively higher melt point paraffin wax, Wax B, as follows, does markedly improve the 73° F. flexibility but only marginally improves the 36° F. flaking characteristics.

| Wax A | PE | Wax C | Wax B | Angle of fracture ||
|---|---|---|---|---|---|
| | | | | 73° F. | 36° F. |
| 78 | 2 | 15 | 5 | 78 | 12 |
| 68 | 2 | 15 | 15 | 78 | 10 |
| 58 | 2 | 15 | 25 | 78 | 11 |
| 53 | 2 | 15 | 30 | 78 | 13 |

It is noticed that there is a substantial improvement in the angle of fracture at 73° F. (from about 13° to 78°+) but only slight improvement at 36° F. (from 8° to about 11°).

Example VII

The substitution of LPP for PE in a similar composition to Example VI has a detrimental effect on flaking. This is illustrated as follows:

| Wax A | PE | LPP | Wax C | Wax B | Angle of fracture ||
|---|---|---|---|---|---|---|
| | | | | | 73° F. | 36° F. |
| 64 | 0 | 1 | 15 | 20 | 9 | 7 |
| 64 | 1 | 0 | 15 | 20 | 78 | 12 |

It is also noticed that PE can be reduced to 1 percent and not affect flexibility. (Compare with Example VI.) However, the PE route has not produced a wax composition possessing excellent non-flaking characteristics. According to the hereinabove correlation, an angle of fracture at 36° F. of 12 is equivalent to 11 grams of wax per 1,000 milk cartons.

Example VIII

The benefit obtained by blending PE and LPP in the wax composition of Example VII is illustrated as follows:

| Wax A | Wax B | Wax C | PE | LPP | Angle of fracture ||
|---|---|---|---|---|---|---|
| | | | | | 73° F. | 36° F. |
| 63 | 20 | 15 | 1 | 1 | 24 | 16 |

This is an excellent non-flaking wax composition. The amount of flaking is down to the 2–3 grams per 1,000 milk carton range.

According to this invention, a wax composition having substantially non-flaking characteristics must comprise essentially from 55% to 69% of relatively low melt point paraffin wax having a melt point between 125° F. and 132° F., viscosity at 210° F. of between 37 and 41 seconds, and a tensile strength at 40° F. of from 275 p.s.i. to 325 p.s.i., the tensile strength at 40° F. being at least 25 p.s.i. higher than the tensile strength at 70° F.; from 20% to 25% of relatively high melt point paraffin wax having a melt point between 148° F. and 154° F., viscosity at 210° F. of from 40 to 46 seconds, and a penetration at 100° F. of from 13 to 19; from 10% to 15% microcrystalline wax having a penetration at 110° F. of from 69 to 75, a viscosity at 210° F. of from 70 to 79 seconds, and an adhesion value of from 30 to 120; from 0.5% to 2% polyolefin wax selected from the group consisting of polypropylene and polyethylene; and from 0.5% to 3% of liquid polypropylene; said wax composition having a Tinius-Olsen angle of fracture at 36° F. of at least 15° and at 73° F. of at least 20°.

On storing wax slabs prepared from the compositions of the present invention for long periods of time under ambient temperature conditions, which includes a temperature of about 90° F., no blocking of the slabs is observed.

The present wax composition is primarily intended for use in coating fibrous fluid containers, particularly cardboard milk containers, which may be advantageously accomplished by dipping or spraying the containers in or with molten wax. The present wax composition may be used in many other applications, especially where high tensile strength and low temperature flexibility and adherence is desirable, such as in the coating of metal fluid containers, canvas impregnation, coating paper drinking cups, etc.

Furthermore, it is recognized that the wax composition of the present invention may have added thereto various additives, such as antioxidants in amounts ranging from .0015% to 2%. Certain amides may also be incorporated to, for example, reduce frictional drag of a wax coated milk carton moving through conventional packaging equipment.

I claim:

1. A wax composition wtih non-flaking characteristics having a Tinius-Olsen angle of fracture at 36° F. of at least 15° and at 73° F. of at least 20°, and comprising essentially a major proportion of a relatively low melt point paraffin wax and minor proportions of laminating microcrystalline wax, relatively high melt point paraffin wax, low molecular weight polyolefin wax, and liquid polypropylene.

2. A wax composition according to claim 1 wherein said polyolefin wax is polyethylene.

3. A wax composition according to claim 1 wherein said polyolefin wax is isotactic polypropylene.

4. A wax composition comprising essentially from 55% to 69% of relatively low melt point paraffin wax having a melt point between 125° and 132° F., viscosity at 210° F. of between 37 and 41 seconds, and a tensile strength at 40° F. of from 275 p.s.i. to 325 p.s.i., the tensile strength at 40° F. being at least 25 p.s.i. higher than the tensile strength at 70° F.; from 20% to 25% of relatively high melt point paraffin wax having a melt point between 148° F. and 154° F., viscosity at 210° F. of from 40 to 46 seconds, and a penetration at 100° F. of from 13 to 19; from 10% to 15% microcrystalline wax having a penetration at 110° F. of from 69 to 75, a viscosity at 210° F. of from 70 to 79 seconds, and an adhesion value of from 30 to 120; from 0.5% to 2% polyolefin wax selected from the group consisting of polypropylene and polyethylene; and from 0.5% to 3% of liquid polypropylene; said wax composition having a Tinius-Olsen angle of fracture at 36° F. of at least 15° and at 73° F. of at least 20°.

5. A wax composition according to claim 4 wherein said Tinius-Olsen angle of fracture at 36° F. is between 15° and 50° and at 73° F. between 20° and 78°+.

6. A wax composition according to claim 4 wherein said polyolefin wax is polyethylene.

7. A wax composition according to claim 5 wherein said polyolefin wax is polyethylene.

8. A container for packaging liquids formed from fibrous sheet material and provided with an adherent non-flaking moisture resistant coating, said coating being a hydrocarbon composition comprising essentially from 55% to 69% of relatively low melt point paraffin wax having a melt point between 125° F. and 132° F., viscosity at 210° F. of between 37 and 41 seconds, and a tensile strength at 40° F. of from 275 p.s.i. to 325 p.s.i., the tensile strength at 40° F. being at least 25 p.s.i. higher than the tensile strength at 70° F.; from 20% to 25% of relatively high melt point paraffin wax having a melt point between 148° F. and 154° F., viscosity at 210° F. of from 40 to 46 seconds, and a penetration at 100° F. of from 13 to 19; from 10% to 15% microcrystalline wax having a penetration at 110° F. of from 69 to 75, a viscosity at 210° F. of from 70 to 79 seconds, and an adhesion value of from 30 to 120; from 0.5% to 2% polyolefin wax selected from the group consisting of polypropylene and polyethylene; and from 0.5% to 3% of liquid polypropylene; said wax composition having a Tinius-Olsen angle of fracture at 36° F. of at least 15° and at 73° F. of at least 20°.

9. A container according to claim 8 wherein said polyolefin wax is polyethylene.

10. A container according to claim 9 wherein said liquid is milk.

No references cited.